United States Patent
Crombez et al.

(10) Patent No.: US 8,909,404 B2
(45) Date of Patent: Dec. 9, 2014

(54) INFORMATION DISPLAY SYSTEM AND METHOD

(71) Applicant: Ford Global Technologies, LLC, Dearborn, MI (US)

(72) Inventors: Dale Scott Crombez, Livonia, MI (US); Ryan J. Skaff, Farmington Hills, MI (US); William Paul Perkins, Dearborn, MI (US); Derek Hartl, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 13/832,780

(22) Filed: Mar. 15, 2013

(65) Prior Publication Data

US 2014/0277874 A1 Sep. 18, 2014

(51) Int. Cl.
| | | |
|---|---|---|
| *B60L 9/00* | (2006.01) | |
| *B60Q 1/00* | (2006.01) | |
| *B60W 50/14* | (2012.01) | |
| *B60W 10/06* | (2006.01) | |
| *B60W 10/08* | (2006.01) | |
| *B60W 20/00* | (2006.01) | |

(52) U.S. Cl.
CPC ............. *B60W 50/14* (2013.01); *B60W 10/06* (2013.01); *B60W 10/08* (2013.01); *B60W 20/00* (2013.01); *Y10S 903/93* (2013.01)
USPC ............................. 701/22; 340/439; 903/930

(58) Field of Classification Search
USPC ........................................... 701/22; 340/439
See application file for complete search history.

(56) References Cited

U.S. PATENT DOCUMENTS

| | | | |
|---|---|---|---|
| 6,092,021 A | 7/2000 | Ehlbeck et al. | |
| 6,925,425 B2* | 8/2005 | Remboski et al. | 702/188 |
| 7,024,306 B2 | 4/2006 | Minami et al. | |
| 7,072,762 B2 | 7/2006 | Minami et al. | |
| 7,505,842 B2* | 3/2009 | Luh | 701/55 |
| 7,603,228 B2 | 10/2009 | Coughlin | |
| 7,765,058 B2* | 7/2010 | Doering | 701/123 |
| 8,116,971 B2* | 2/2012 | Chen et al. | 701/123 |
| 8,155,867 B2* | 4/2012 | Krause | 701/123 |
| 8,280,619 B2* | 10/2012 | Watkins | 701/123 |
| 8,483,904 B2* | 7/2013 | Viggers | 701/33.4 |
| 8,577,568 B2* | 11/2013 | Sujan et al. | 701/64 |
| 8,682,572 B2* | 3/2014 | Raz et al. | 701/123 |
| 8,726,059 B2* | 5/2014 | Acosta-Cazaubon et al. | 713/340 |
| 2006/0202811 A1 | 9/2006 | Taguchi | |

(Continued)

FOREIGN PATENT DOCUMENTS

| | | |
|---|---|---|
| EP | 1775501 A1 | 4/2007 |
| JP | 11220807 A | 8/1999 |

(Continued)

*Primary Examiner* — Thomas G Black
*Assistant Examiner* — Tyler Paige
(74) *Attorney, Agent, or Firm* — David B. Kelley; Brooks Kushman P.C.

(57) ABSTRACT

A user interface for conveying tips on driving behaviors or vehicle settings that will improve vehicle efficiency may be provided. The tips may be listed on an information display along with an efficiency impact value associated with each tip. The efficiency impact values may be conveyed in terms of fuel economy, vehicle range, emissions or some other value. Accordingly, the user interface may communicate ways to improve a vehicle's efficiency, as well as quantify the potential improvement in meaningful terms.

19 Claims, 3 Drawing Sheets

(56) References Cited

U.S. PATENT DOCUMENTS

| | | |
|---|---|---|
| 2007/0001831 A1* | 1/2007 | Raz et al. ............... 340/439 |
| 2007/0276582 A1 | 11/2007 | Coughlin |
| 2008/0120175 A1* | 5/2008 | Doering ............... 705/14 |
| 2009/0040033 A1 | 2/2009 | Uchida |
| 2009/0066495 A1 | 3/2009 | Newhouse et al. |
| 2010/0073158 A1* | 3/2010 | Uesaka et al. ......... 340/450.2 |
| 2010/0191403 A1* | 7/2010 | Krause ............... 701/29 |
| 2011/0205043 A1* | 8/2011 | Fujiki et al. ............ 340/439 |
| 2011/0307118 A1* | 12/2011 | Bryant et al. ............ 701/1 |
| 2013/0054125 A1* | 2/2013 | Bruemmer et al. ......... 701/123 |
| 2014/0081493 A1* | 3/2014 | Shemyakin et al. ......... 701/22 |

FOREIGN PATENT DOCUMENTS

| | | |
|---|---|---|
| JP | 2007210487 A | 8/2007 |
| JP | 2008197076 A | 8/2008 |
| WO | 2008087541 A1 | 7/2008 |
| WO | 2009004224 A2 | 1/2009 |

\* cited by examiner

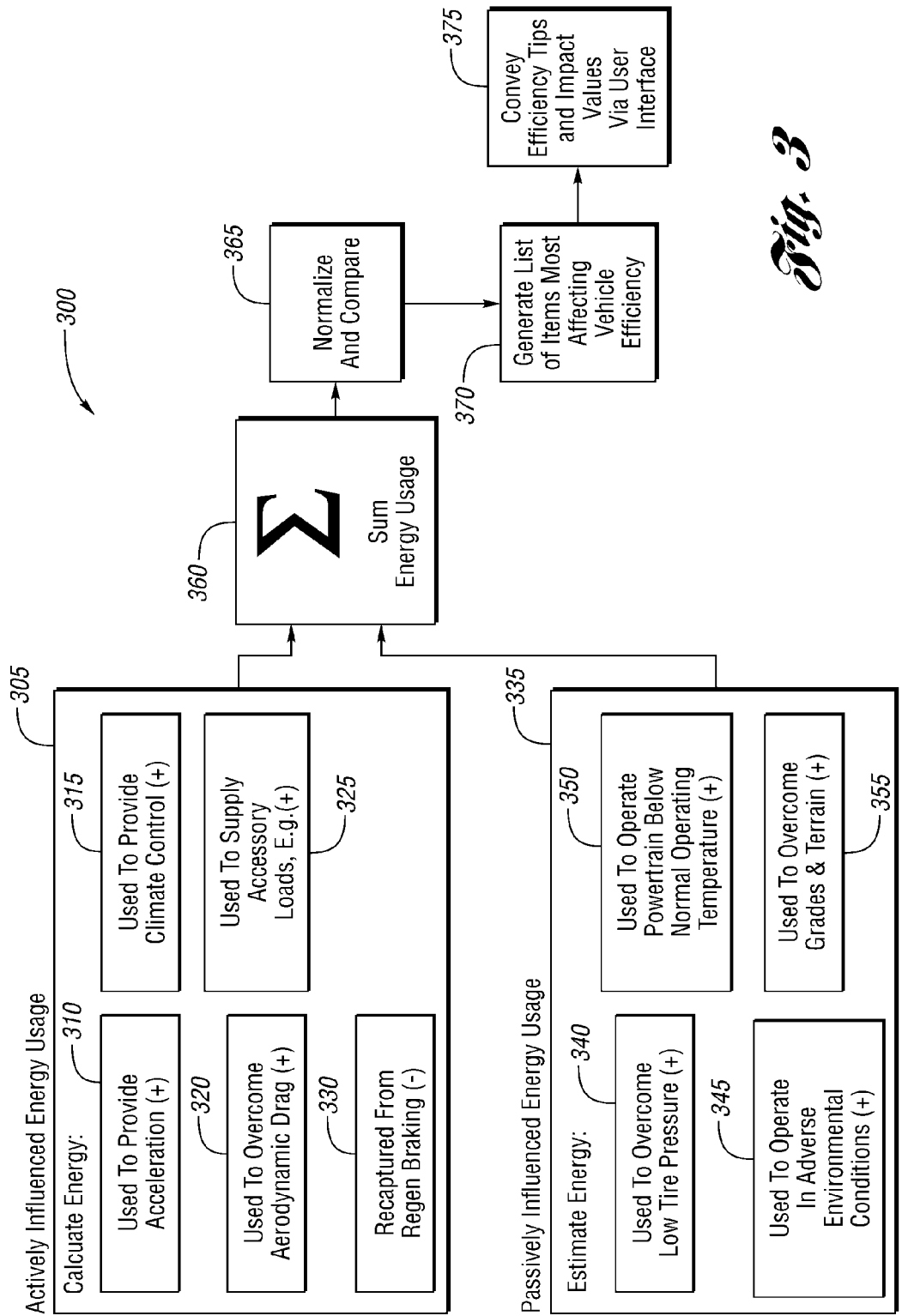

INFORMATION DISPLAY SYSTEM AND METHOD

TECHNICAL FIELD

The present application relates to a system and method for conveying the impact of modified driving behaviors, or changes in vehicle settings or conditions, on vehicle efficiency.

BACKGROUND

All vehicles, whether passenger or commercial, include a number of gauges, indicators, and various other displays to provide the vehicle operator with information regarding the vehicle and its surroundings. With the advent of new technologies, such as hybrid electric vehicles (HEVs), plug-in hybrid electric vehicle (PHEVs) and battery electric vehicles (BEVs), has come a variety of new gauges and information displays that help guide drivers to better learn, understand and operate these vehicles that utilize new technology. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

It is known that some drivers may not be able to achieve desired fuel economy or energy efficiency numbers, in part because of their driving habits. In many cases, drivers are willing to modify their behavior, but are unable to translate recommended techniques into real changes in their driving habits. In other cases, drivers may not be convinced or otherwise persuaded to alter their driving habits in order to improve efficiency because the impact of such changes is believed to be relatively minimal. With the increase in sensing electronics, computers and other related technology on board a vehicle, the amount of information that can be communicated to the driver is virtually limitless. Often, drivers may not even know of all the features and capabilities their vehicle has to offer. Displaying certain types of information, particularly information relevant to HEVs, PHEVs or BEVs, can help facilitate or otherwise encourage economical driving choices or habits. However, retrospective vehicle performance information or operating tips alone may not be sufficient to encourage a driver to change the manner in which a vehicle is being operated to improve overall efficiency.

SUMMARY

According to one or more embodiments of the present application, a vehicle control system may include a controller configured to receive input indicative of energy usage associated with a number of vehicle operating parameters. The controller may be further configured to output at least one operating parameter modification message and an efficiency impact value associated with the operating parameter modification message. The control system may further include an interface in communication with the controller and configured to display the operating parameter modification message and associated efficiency impact value.

In one or more embodiments, the at least one operating parameter modification message may include a plurality of operating parameter modification messages and the interface may be configured to display the plurality of operating parameter modification messages and the efficiency impact value associated with each operating parameter modification message. Moreover, the plurality of operating parameter modification messages may be ranked based on the associated efficiency impact value and the interface may display the plurality of operating parameter modification messages and the efficiency impact value associated with each operating parameter modification message according to their ranking.

The efficiency impact value may be indicative of an estimated potential improvement in an efficiency-related measurable upon compliance the operating parameter modification message. To this end, the efficiency impact value may be a fuel consumption value indicative of an estimated potential impact on fuel economy or a distance value indicative of an estimated potential impact on vehicle range. Alternatively, the efficiency impact value may be indicative of an estimated potential impact on vehicle emissions.

According to one or more additional embodiments, a method for displaying efficiency tips or suggestions may include receiving input indicative of energy usage associated with a number of vehicle operating parameters. For each vehicle operating parameter, an efficiency impact value associated with an operating parameter modification may be calculated based on the input. The method may further include displaying a plurality of operating parameter modification messages, corresponding to the operating parameter modifications, and their associated efficiency impact values.

The method may include ranking the operating parameter modifications based on their associated efficiency impact values and displaying the operating parameter modification messages based on their ranking. In one or more embodiments, the input may be further indicative of energy usage associated with a plurality of efficiency impact factors. Accordingly, the method may further include calculating an efficiency impact value for each efficiency impact factor based on vehicle conditions and energy usage. The vehicle conditions may include operating conditions and environmental conditions.

The method may also include displaying a plurality of efficiency impact factors and their associated efficiency impact values. The step of displaying a plurality of efficiency impact factors and their associated efficiency impact values may include ranking the efficiency impact factors based on their associated efficiency impact values and displaying a plurality of the efficiency impact factors and their associated impact values based on the ranking. Moreover, the step of displaying a plurality of efficiency impact factors and their associated efficiency impact values may occur during vehicle shut down.

The efficiency impact value may be a fuel consumption value indicative of an estimated potential impact on fuel economy or a distance value indicative of an estimated potential impact on vehicle range. Alternatively, the efficiency impact value may be indicative of an estimated potential impact on vehicle emissions.

According to one or more additional embodiments of the present application, a control system for a vehicle may include a controller configured to receive input indicative of energy usage associated with a number of vehicle conditions and output a plurality of vehicle condition messages and an efficiency impact value associated with each vehicle condition message based on the input. The control system may further include an interface in communication with the controller. The interface may be configured to display the plurality of vehicle condition messages and their associated efficiency impact values. The plurality of vehicle condition messages may be displayed in order according to their respective efficiency impact values.

BRIEF DESCRIPTION OF THE DRAWINGS

FIG. 3 is a simplified, exemplary functional block diagram, in accordance with one or more embodiments of the present application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
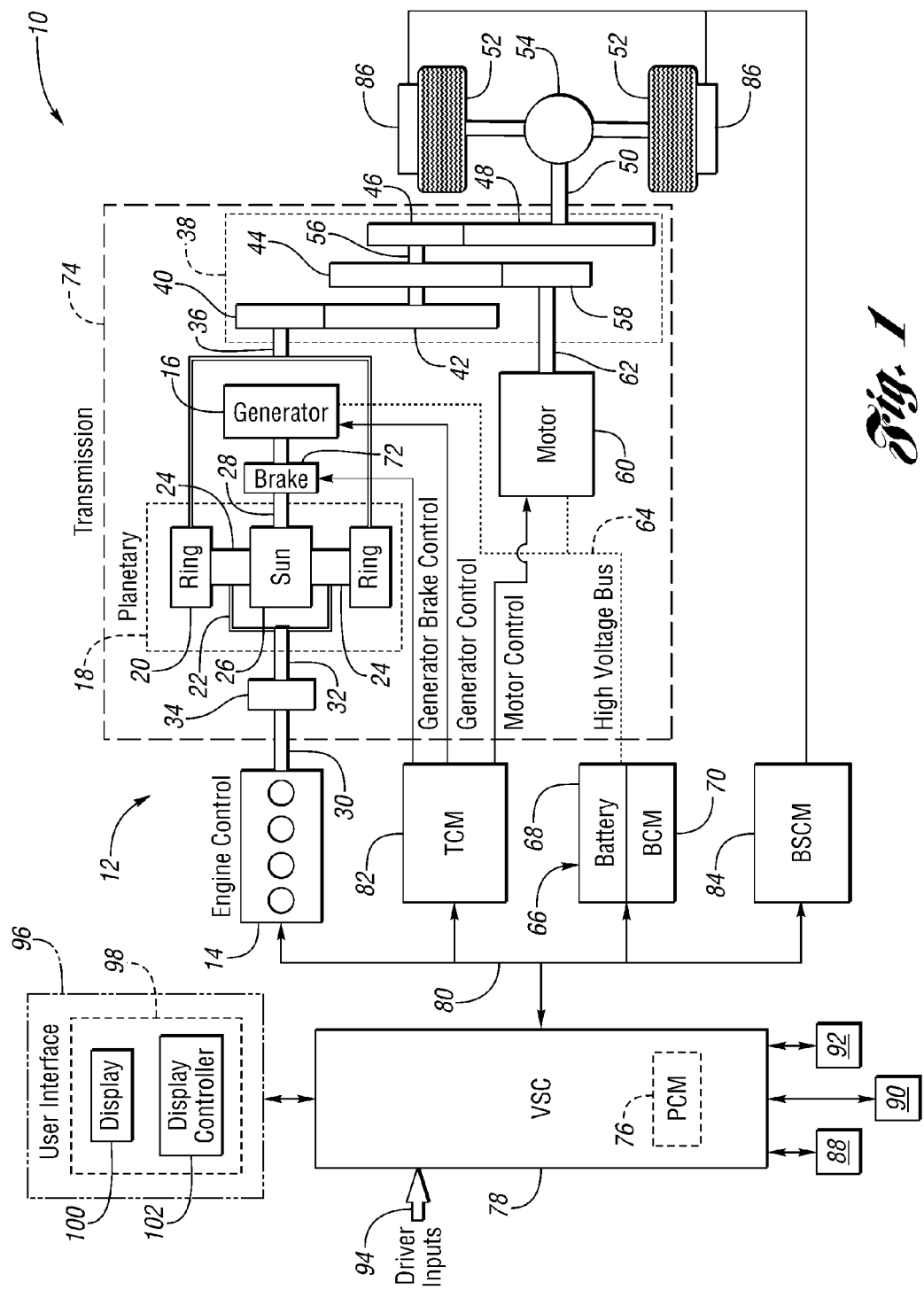
FIG. 1 is a simplified, exemplary schematic representation of a vehicle, in accordance with one or more embodiments of the present application.

Referring now to the drawings, FIG. 1 is a simplified, exemplary schematic representation of a vehicle 10, which is shown having a power-split or series-parallel hybrid powertrain 12. The vehicle 10 depicted in FIG. 1 is representative of one of several possible applications for the systems and methods of the present disclosure. While vehicle 10 is depicted as having a series-parallel hybrid powertrain, it should be appreciated that aspects of the present application may transcend any particular hybrid powertrain configuration. Moreover, it is understood that one or more embodiments of the present application may be implemented on other types of vehicles, such as those powered by an internal combustion engine alone, electric motor alone, a fuel cell, or the like.

The vehicle 10 may include an engine 14 and an electric machine, or generator 16. The engine 14 and the generator 16 may be connected through a power transfer arrangement, which in this embodiment, is a planetary gear arrangement 18. Of course, other types of power transfer arrangements, including other gear sets and transmissions, may be used to connect the engine 14 to the generator 16. The planetary gear arrangement 18 includes a ring gear 20, a carrier 22, planet gears 24, and a sun gear 26.

The generator 16 can also output torque to a shaft 28 connected to the sun gear 26. Similarly, the engine 14 can output torque to a crankshaft 30, which may be connected to a shaft 32 through a passive clutch 34. The clutch 34 may provide protection against over-torque conditions. The shaft 32 may be connected to the carrier 22 of the planetary gear arrangement 18. The ring gear 20 may be connected to a shaft 36 for distributing torque to a gear set 38. The gear set 38 may include step ratio gears comprising meshing gear elements 40, 42, 44, 46 and 48. A torque output shaft 50 for the transmission may be drivably connected to a first set of vehicle drive wheels, or primary drive wheels 52, through a differential and axle mechanism 54.

Gears 42, 44 and 46 may be mounted on a countershaft 56. The gear 44 may engage a motor-driven gear 58. The vehicle 10 may include a second electric machine, or motor 60. The motor 60 may be used to output torque to a shaft 62 for driving gear 58, which acts as a torque input for the countershaft gearing. Other vehicles within the scope of the present application may have different electric machine arrangements, such as more or fewer than two electric machines. In the embodiment shown in FIG. 1, the electric machine arrangement (i.e., the motor 60 and the generator 16) can both be used as motors to output torque. Alternatively, each can also be used as a generator, outputting electrical power to a high voltage bus 64 and to an energy storage system 66, which may include a battery 68 and a battery control module (BCM) 70.

The battery 68 may be a high voltage battery that is capable of outputting electrical power to operate the motor 60 and the generator 16. The BCM 70 may act as a controller for the battery 68 for monitoring and controlling various aspects of the battery operation. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

When the battery 68 is acting as the sole power source with the engine off, the torque input (e.g., crankshaft 30 and shaft 32) and the carrier 22 may be braked by the clutch 34. A mechanical brake 72 may anchor a rotor of the generator 16 and the sun gear 26 when the engine 14 is on and the powertrain 12 is in a parallel drive mode. In this manner, the sun gear 26 may act as a reaction element.

As shown in FIG. 1, the motor 60, the generator 16, the planetary gear arrangement 18, and at least a portion of the gear set 38 may collectively be referred to as transmission 74. To control various aspects of the hybrid powertrain 12, a powertrain controller 76 may be provided. As shown in FIG. 1, the powertrain controller 76 may be incorporated in another general vehicle controller, such as a vehicle system controller (VSC) 78. Alternatively, the powertrain controller 76 may be a dedicated controller for the hybrid powertrain 12. Although the powertrain controller 76 is shown as a single controller, it may include multiple controllers or may include multiple software components or modules embedded in a single controller. For example, the powertrain controller 76 could be a separate hardware device, or may include a separate powertrain control module (PCM), which could be software embedded within a general purpose controller, such as the VSC 78. Likewise, despite being shown as a single controller, the VSC 78 may include multiple controllers or may include multiple software components or modules embedded in a single controller to control various vehicle systems, subsystems and components. For instance, the VSC 78 may include any number of microprocessors, ASICs, ICs, memory (e.g., FLASH, ROM, RAM, EPROM and/or EEPROM) and software code to co-act with one another to perform a series of operations.

For the sake of simplicity, all monitoring, processing and control operations that may be performed by the powertrain controller 76 may be described herein as being carried out by the VSC 78, even though the powertrain controller 76 may be a separate, dedicated controller in communication with the VSC 78. To this end, the VSC 78 may communicate with other controllers (e.g., BCM 70) over a vehicle-wide network, referred to as a controller area network (CAN) 80. CAN 80 may be a hardline vehicle connection (e.g., bus) and may be implemented using any number of communication protocols.

Just as the battery 68 includes a BCM 70, other devices controlled by the VSC 78 may include their own controllers, which may communicate with the VSC 78 through CAN 80. For example, an engine control unit (ECU) (not shown) may communicate with the VSC 78 and may function to monitor and control various aspects of the operation of the engine 14. In addition, the transmission 74 may include a transmission control module (TCM) 82, configured to monitor and coordinate control of specific components within the transmission 74, such as the generator 16 and/or the motor 60. Similarly, a braking system control module (BSCM) 84 may be employed to monitor and control a braking system. The braking system may include a mechanical connection to the vehicle wheels, such as the primary drive wheels 52, to effectuate friction braking using friction brakes 86. The braking system may also be configured for regenerative braking, wherein braking energy may be captured and stored as electrical energy in the battery 68.

Like the BCM 70, the TCM 82 and BSCM 84 may communicate with the VSC 78 over the CAN 80. Alternatively, the aforementioned controllers may be software control modules contained within the VSC 78 or other general purpose controllers residing on the vehicle. Some or all of these various controllers or software control modules can make up a control system in accordance with the present application. It will be appreciated, however, that various aspects of the disclosed subject matter are not limited to any particular type or configuration of the VSC 78, or to any specific control logic for managing operation of the hybrid powertrain 12 or other vehicle systems.

The vehicle 10 may also include a climate control system 88 for performing various HVAC functions. The climate control system 88 may include its own controller (not shown) for communicating with the VSC 78 over the CAN 80. The on/off status of the climate control system 88 can be communicated to the VSC 78, and can be based on, for example, the status of an operator actuated switch, or the automatic control of the climate control system 88 based on related functions such as window defrost. The VSC 78 may also receive input signals indicative of the electrical load associated with climate control operations from the climate control system 88 or directly from the BCM 70.

Also shown in FIG. 1 are simplified schematic representations of a navigation system 90 and a telematics system 92. The navigation system 90 may include a navigation display, a global positioning system (GPS) unit, a navigation controller and an interface for receiving destination information or other inputs from a driver. These components may be unique to the navigation system 90 or may be shared with other vehicle systems. For instance, the GPS unit may form at least part of the telematics system 92. The navigation system 90 may also communicate distance and/or location information associated with the vehicle 10, its target destinations, charge point locations, or other relevant GPS waypoints. The navigation system 90 may display map data in connection with a current vehicle location. The navigation system 90 may also calculate travel routes and provide corresponding route guidance to a driver based on the obtained destination information, charging station locations, and other points of interest (POIs).

The telematics system 92 combines telecommunications and information processing. In particular, the telematics system 92 may enable communication between the vehicle 10 and one or more communication systems such as telephone systems and satellite systems. The telematics system 92 may include a number of antennas and transceivers for wirelessly communicating with one or more external satellite-based sources and/or terrestrial sources by way of radio transmissions, microwave transmissions, cellular networks, or the like. In addition to GPS, the external sources may include traffic information systems and weather information systems, among other sources. Accordingly, the telematics system 92 may receive input signals relating to vehicle location, as well as relevant weather and traffic information based on the vehicle location.

The VSC 78 may also receive various manual inputs manipulated by a vehicle operator, illustrated schematically in FIG. 1 as a driver inputs system 94. The driver inputs system 94 may include an accelerator pedal having one or more sensors, such as an accelerator pedal position sensor (APPS), which may communicate information such as throttle input to the VSC 78. The driver inputs system 94 may also include a brake pedal and brake pedal position sensor (BPPS) for communicating brake demand to the VSC 78 and/or BSCM 84. The driver inputs system 94 may also include a gear selector that communicates a gear selection (PRNDL) signal. The VSC 78 may receive additional input signals from the driver inputs system 94, such as inputs from a parking brake, a steering wheel, and switches for performing various operations or controlling various accessories.

The VSC 78 may communicate with each individual vehicle system to monitor and control vehicle operation according to programmed algorithms and control logic. In this regard, the VSC 78 may help manage the different energy sources available and the mechanical power being delivered to the wheels 52 in order to optimize fuel economy and/or maximize the vehicle's range.

The VSC 78 may include a programmable digital computer and suitable input/output circuitry or the like that is configured to receive the various input signals indicative of a condition of the vehicle system components. The input signals may be communicated from the vehicle system components themselves, or device-specific controllers, or may be received from various vehicle system sensors, antennas, or manual inputs, such as those described above. The VSC 78 may process these input signals and others according to logic rules to monitor and control operation of the hybrid powertrain 12.

In addition to the foregoing, the vehicle 10 may include a user interface 96 to facilitate communication with a driver. The user interface 96 may communicate with the VSC 78 and may convey relevant content to the driver of the vehicle 10. According to one or more embodiments of the present application, the user interface 96 may include an information display system 98 for providing the interface between the driver and the various vehicle systems, such as the hybrid powertrain 12. The information display system 98 may include an information display 100 electrically connected to a display controller 102. The display controller 102 may communicate with the powertrain controller 76, the TCM 82, the BCM 70, the BSCM 84 and other dedicated or general purpose controllers, such as the VSC 78. The display controller 102 may gather data from various vehicle systems and components such as the TCM 82, the BCM 70, the BSCM 84, the climate control system 88, vehicle accessories, and the like, which may be accessed via the CAN 80. Moreover, the display controller 102 may provide data to the information display 100 for conveying vehicle operation information to the driver in a meaningful manner. Signals output from the various vehicle systems and components may be processed, and display computations may be carried out, in the VSC 78, the display controller 102 or the information display 100, or some combination thereof.

Despite being shown as a separate controller, the display controller 102 may be integrated with the VSC 78 or another general or dedicated vehicle controller. Thus, as with the powertrain controller 76, all monitoring, processing and control operations that may be performed by a separate display controller may be described herein as being carried out by the VSC 78. Indeed, as used herein, any reference made to a controller in general may refer to the VSC 78, or may refer to another general or device-specific controller, such as the powertrain controller 76, the display controller 102, or any combination thereof.

The information display 100 may convey a host of information about the vehicle and its surroundings using graphical, schematic, numerical, textual and/or iconic representations or images. The display 100 may be disposed within a dashboard (not shown) of the vehicle 10, such as in an instrument panel or center console area. Moreover, the display 100 may be part of another user interface system, such as the navigation system 90, or may be part of a dedicated information display system. The display 100 may be a liquid crystal display (LCD), a plasma display, an organic light emitting display (OLED), or any other suitable display. The display 100 may include a touch screen for receiving driver input associated with selected areas of the display. The user interface 96 or display 100 may also include one or more buttons (not shown), such as hard keys or soft keys, for receiving driver input.

One or more embodiments of the present application may be implemented using the user interface 96, in particular the information display system 98. The controller may regularly receive vehicle data, including operational and environmental data, from communicatively connected devices, such as those described above. Moreover, the data may be processed into one or more representations that may be displayed on the information display 100, including information that may encourage efficient driving behavior or other economical vehicle operating choices. For instance, the information display 100 may provide tips that inform a vehicle operator of actions that can improve vehicle efficiency, as well as the potential impact of those actions.

The rate at which a vehicle consumes energy may impact its overall efficiency. Therefore, by reducing energy usage, in particular, the energy consumption rate, vehicle efficiency can be improved. To this end, the controller may be configured to receive input signals that are indicative of energy usage relating to a number of conditions of the vehicle 10. Depending on the vehicle type, energy usage may refer to electrical energy, fuel energy, or a combination of the two. It may even include energy consumed from other types of energy storage devices, such as chemical energy, hydraulic energy, and the like. Vehicle conditions may include, for example, vehicle operating parameters (e.g., speed, acceleration, etc.) or environmental conditions (e.g., weather, terrain, etc.).

The input signals may be actual energy consumption values associated with use of a particular vehicle system or component. The energy consumption values may be received by the controller directly from a vehicle device or a corresponding device controller. Alternatively, the input signals may include vehicle data that the controller may use to calculate or estimate energy usage attributed to various vehicle operations, settings or other conditions affecting the efficiency rating of the vehicle 10. Accordingly, the input signals may include hybrid powertrain data received from the engine control unit, the TCM 82, the BCM 70, the BSCM 84, or the like. Additionally, the input signals may include data from other vehicle systems and components, such as the climate control system 88, the navigation system 90, the telematics system 92, a tire pressure monitoring system (not shown), or various vehicle accessories.

Figure 2A:
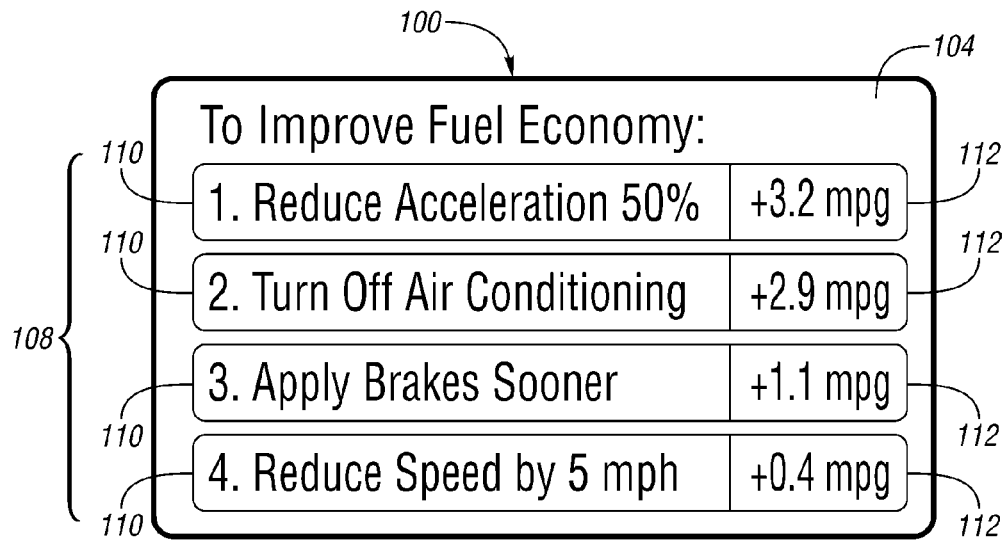
FIG. 2a depicts an exemplary vehicle display, in accordance with one or more embodiments of the present application.
Figure 2B:
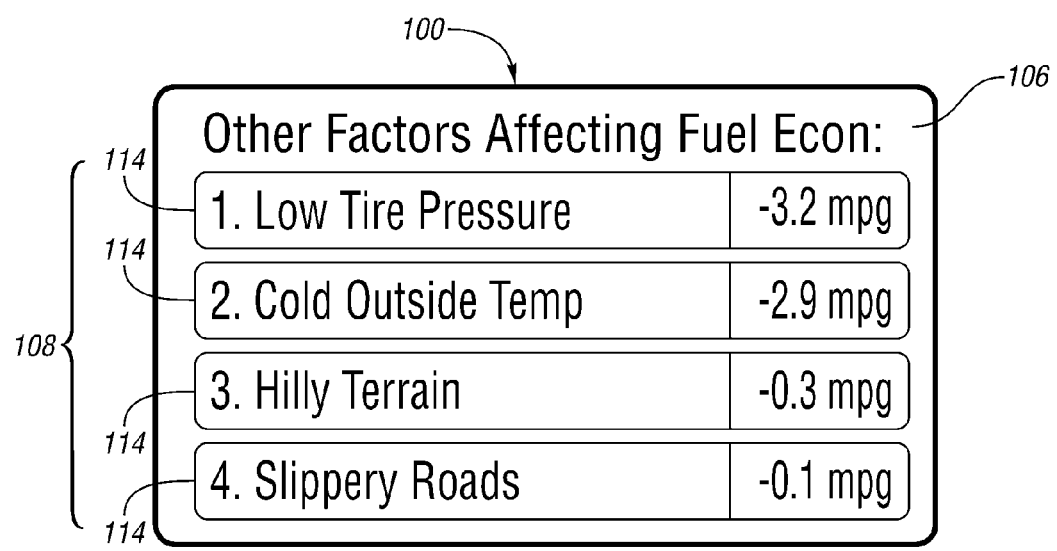
FIG. 2b depicts another exemplary vehicle display, in accordance with one or more embodiments of the present application.

Referring generally to FIGS. 2a and 2b, the information display 100 is shown in greater detail in accordance with one or more embodiments of the present application. As previously described, the display 100 may be generally used to convey relevant vehicle content to a driver of the vehicle 10. The display content may include, for example, information relating to the operation of the vehicle 10 and/or the impact certain vehicle operations, settings or conditions may have on efficiency-related measurables such as fuel economy, emissions, vehicle range, or the like. In particular, FIGS. 2a and 2b illustrate exemplary display screens 104, 106 for communicating vehicle efficiency tips. Each display screen 104, 106 may show a list of items 108 affecting the vehicle's efficiency rating.

With reference to FIG. 2a, the list of items 108 may include a plurality of operating parameter modification messages 110. The operating parameter modification messages 110 may refer to actions (e.g., operating parameter modifications) that a driver can take to improve the vehicle's efficiency rating, including suggested changes in driving behavior or vehicle settings. In addition to the operating parameter modification message 110, each displayed item 108 may further include an efficiency impact value 112 corresponding to the operating parameter modification message 110. According to one or more embodiments of the present application, the efficiency impact value 112 may indicate a potential impact on vehicle efficiency that may result from the operating parameter modification suggested in the associated operating parameter modification message 110. The efficiency impact value 112 for each operating parameter modification may be calculated based on current energy usage and vehicle conditions. Accordingly, the operating parameter modification messages 110 and corresponding efficiency impact values 112 may be textual and numerical representations output by the display controller 102 for display on the information display 100. Moreover, the operating parameter modification messages 110 and corresponding efficiency impact values 112 may be based on the input signals indicative of energy usage associated with various vehicle operating parameters.

As shown in FIG. 2a, the efficiency impact value 112 may be conveyed in terms of fuel economy, such as miles per gallon (MPG) or some other fuel economy unit. However, it should be appreciated that the efficiency impact value 112 may be conveyed using another energy usage value or other efficiency-related measurable that a vehicle operator may find meaningful. For instance, the efficiency impact value 112 may be displayed in terms of vehicle range (i.e., distance), which may be particularly meaningful when aspects of the present application are employed in a BEV. As another example, the efficiency impact value 112 may convey the impact on vehicle emissions (e.g., pounds of carbon dioxide (lbs $CO_2$)) that a corresponding operating parameter modification may make. Alternatively, the efficiency impact value 112 may be comparative in nature and, thus, may be displayed as a percentage. For example, the efficiency impact value 112 may indicate a potential percent change in overall efficiency resulting from the corresponding operating parameter modification. The percentage may be calculated by dividing a potential improvement value in an efficiency-related measurable (e.g., fuel economy, range, emissions, etc.) by a current efficiency value expressed in the same units as the potential improvement value. For instance, if turning off air conditioning may lead to a potential fuel economy improvement of +2.9 mpg and the current fuel economy is 43.3 mpg, the associated efficiency impact value 112 may be conveyed as a potential fuel economy improvement of 6.7%. As another example, the efficiency impact value 112 may indicate a percent relative change in overall efficiency as compared to another driver.

The efficiency impact value 112 may also be conveyed in other dimensionless numbers. As one example, a point system can be employed such that each efficiency impact value may be conveyed as a point value. As a further example of this, point values may be assigned based on each modification's potential efficiency improvement value relative to the sum of the potential efficiency improvement values for all operating parameter modifications suggested in the operating parameter modification messages. For instance, if improving regenerative braking can yield +1.1 mpg, and the sum of the FE improvements is +7.6 mpg, then the potential impact of improved regenerative braking may be displayed as 14 points (i.e., 1.1/7.6*100).

The vehicle 10 requires energy to accelerate, operate the air conditioner or heater, and perform a host of other vehicle operations. As a result, this energy usage may adversely affect the vehicle's fuel economy. An energy conscious driver may want to know how to improve the fuel economy through direct changes to one or more vehicle operating parameters, for example, by modify driving behaviors or climate usage. Accordingly, exemplary operating parameter modification messages 110 may include suggestions to reduce acceleration a certain amount, turn off the air conditioning, apply the brakes sooner, reduce vehicle speed by a certain amount, or the like, as shown in FIG. 2a.

Although numerous operating parameters may be modified during vehicle operation, the number of operating parameter modification messages 110 displayed on the information display 100 may be limited for emphasis, due to space constraints, or some other reason based on design considerations. Accordingly, the controller may prioritize the operating parameter modification messages 110 that it causes to be displayed. For instance, priority may be given to operating parameters that are more easily modified or changed by a typical driver. Additionally or alternatively, the controller may prioritize operating parameter modifications having the potential to provide the biggest impact on fuel economy and cause the information display 100 to display the corresponding operating parameter modification messages 110. In this regard, the controller may rank the operating parameter modifications based on their corresponding efficiency impact values 112. Moreover, the information display 100 may display the corresponding operating parameter modification messages 110 according to their ranking. For example, the operating parameter modification resulting in the greatest fuel economy improvement, if successfully carried out, may be displayed at the top of the list of displayed items 108.

As provided by the example shown in FIG. 2a, upon reducing acceleration by 50%, based on current energy usage and driving conditions, the vehicle 10 may potentially realize an increase in fuel economy of 3.2 mpg. The ranked list of operating parameter modification messages 110 may provide a driver with concrete suggestions for modifying driving behavior or vehicle settings. By quantifying and displaying the potential impact of the operating parameter modifications as well, using the corresponding efficiency impact values 112, the driver may be more inclined or encouraged to comply with the suggested behavior. The data relating to the operation of vehicle 10 may be continuously updated in real-time based on the current vehicle conditions. As a result, the efficiency impact values 112 may be continuously or periodically recalculated and the display 100 may be modified accordingly.

As previously described, in addition to vehicle operating parameters, vehicle conditions may also include environmental conditions or other efficiency impact factors that a driver cannot control or has limited ability to control. Such environmental conditions may include weather, terrain, traffic, road conditions, or the like. For example, cold ambient temperatures may result in additional energy usage associated with powertrain warm-up. The powertrain 12 may also consume more energy when the terrain is relatively hilly. Likewise, slippery road conditions or heavy traffic may negatively impact fuel economy through the relative increase in energy usage attributed thereto. However, the driver may have little to no control over these environmental conditions during a trip. Another factor affecting vehicle efficiency may be tire pressure. Low tire pressure may negatively impact fuel economy. While a driver can add air pressure to the tires, this feat is not easily achieved during normal vehicle operation (e.g., while the vehicle 10 is being driven). Accordingly, these factors may be displayed on a separate display screen from the operating parameter modification messages 110, as shown in FIG. 2b.

According to one or more embodiments, the display screen 106 showing these other efficiency impact factors may be displayed when the vehicle 10 is not being driven. For instance, the exemplary display screen 106 shown in FIG. 2b may appear upon vehicle shut-down to convey information regarding other factors impacting fuel economy. Similar to the display screen 104 in FIG. 2a, the display screen 106 may include a plurality of vehicle condition messages 114. Each message may describe or otherwise relate to an environmental condition or other factor, collectively referred to as efficiency impact factors, which may not be directly controlled through real-time driver operating behaviors. The controller may also calculate efficiency impact values 112 associated with each efficiency impact factor. Correspondingly, an efficiency impact value 112 may be displayed in connection with each associated vehicle condition message 114. In this case, the efficiency impact values 112 may convey the negative impact on fuel economy of the corresponding vehicle conditions. Accordingly, the exemplary display screen 106 in FIG. 2b may help a driver better understand why fuel economy may be lower than expected in certain conditions despite modifying real-time operating behavior. Similar to the operating parameter modification messages 110, the vehicle condition messages 114 may be likewise ranked based on their efficiency impact values 112 and displayed on the information display 100 according to their respective ranking.

According to one or more embodiments, a driver may select one of the displayed operating parameter modification messages 110 or vehicle condition messages 114 to learn more about the selected item. The selection input may be received via a touch screen. In selecting a certain area of the display 100 occupied by a listed item 108, a pop-up dialog box may appear providing the driver with additional information regarding the corresponding vehicle operation or condition. The selection input may also be received by different means as well, such as a button or switch adjacent the selected message.

FIG. 3 depicts a simplified, exemplary functional block diagram 300 for calculating and displaying the impact on vehicle efficiency of certain vehicle conditions based at least in part on current energy usage. As seen therein, actively influenced energy usage may be calculated at block 305. Actively influenced energy usage may generally refer to energy usage associated with vehicle operating parameters that a driver can control or modify while operating the vehicle, at least to a certain extent. Accordingly, actively influenced energy usage may generally correspond to the energy usage described above with respect to FIG. 2a. The controller may calculate the actively influenced energy usage based on the input signals it receives from the hybrid powertrain 12 and other vehicle systems and components. For example, as shown in block 305, the controller may calculate, among other things, energy used to: provide acceleration (310), provide climate control functions (315), overcome aerodynamic drag (320), supply accessory loads (325), and the like. The controller may also deduct the amount of energy recaptured from regenerative braking (330). Although illustrated in terms of energy usage, the impact of each operating parameter may be calculated and/or converted into other units as well, such as fuel economy, range, emissions, or the like.

The aforementioned energy usage values may be calculated, estimated, or otherwise determined in a number of ways. For instance, the energy used to provide acceleration (310) may be determined based on a comparison of actual acceleration to a calibrated minimum acceleration value for which energy usage is known. Using a look-up table, an energy usage value can be obtained based on the difference. Alternatively, the difference can be equated to a fuel economy gain or reduction based on predetermined data (e.g., a look-up table). The actual acceleration may be determined, at least in part, from an input signal received from the APPS. The energy used to provide climate control (315) may be calculated from power usage attributed to the operation of the AC compressor or blower motor. The impact on fuel economy may be estimated from real-time model calculations involving AC power usage. Likewise, the energy used to supply accessory loads (325) may be similarly calculated. The energy used to overcome aerodynamic drag (320) may be calculated from the vehicle speed and modeled road-load (i.e., aerodynamic) losses. Thus, fuel economy improvements from reducing vehicle speed can be similarly calculated.

The amount of energy recaptured through regenerative braking (330) may offset some of the other energy losses. When the total braking demand exceeds the regenerative braking limit, the friction brakes 86 may be employed to make up the difference resulting in energy lost to heat. By modifying braking behavior (e.g., by applying the brakes sooner), the amount of energy recaptured through regenerative braking may be optimized leading to a corresponding improvement in fuel economy. The difference between the instantaneous regenerative braking amount and the total braking demand (i.e., the friction braking amount) may be equated to fuel economy using a look-up table. Thus, the amount of regenerative braking energy recaptured may be compared to a theoretical max to calculate a corresponding fuel economy improvement potential. Moreover, this calculation may also include the influence of battery charging limits, stability, battery age and health, or the like, on the total regenerative braking limit.

Passively influenced energy usage may be calculated or otherwise estimated at block 335. Passively influenced energy usage may generally refer to energy usage influenced by environmental conditions or other factors that a driver cannot control or modify while operating the vehicle. Accordingly, passively influenced energy usage may generally correspond to the energy usage described above with respect to FIG. 2b. Again, the impact of each environmental condition or other factor may be calculated and/or converted into other units as well, such as fuel economy, range, emissions, or the like. The controller may estimate the passively influenced energy usage based on the input signals it receives from, for example, various vehicle sensors or the telematics system 92. For instance, as shown in block 335, the controller may estimate, among other things, energy used to: overcome low tire pressure (340), operate the vehicle 10 in adverse environmental conditions (345), operate the hybrid powertrain 12 below normal operating temperature (350), overcome road grades & terrain (355), or the like.

Energy usage associated with overcoming low tire pressure may be estimated based on TPMS measurements compared against recommended tire pressure. The difference in pressure may be applied to a look-up table for obtaining an energy usage estimate. Alternatively, the look-up table may provide an estimated efficiency impact value associated with the low tire pressure reading. Energy usage associated with adverse environmental conditions may be estimated from such information as all-wheel drive (AWD) engagement data and wheel slip data. Powertrain warm-up data may be used to evaluate vehicle efficiency and estimate the additional energy consumed by operating the vehicle in cold ambient temperatures. Finally, energy used to traverse hilly terrain may be estimated based on calculations using grade sensors and map data associated with GPS coordinates.

Using energy usage values as an example, once both actively and passively influenced energy usages are determined, the energy usages may be totaled to obtain a value corresponding to overall energy usage for the vehicle 10, as provided at block 360. Further, the potential improvements in energy usage or other efficiency value may also be summed to obtain a total improvement value. The overall value may be compared to a theoretical maximum, obtained from a look-up table or other method, and corrects some or all of the potential improvement values based on this analysis, as provided at block 365. For example, if the current fuel economy value plus the sum of the potential fuel economy improvements exceeds a maximum theoretical fuel economy for given current conditions, then a corrective algorithm may adjust one or more of the improvement values. Each fuel economy improvement value may be lowered proportionally by a correction factor. Alternatively, the fuel economy improvement value for the operating parameter modification most likely to cause the overestimation may be lowered disproportionally.

Furthermore, at block 365, each actively influenced energy usage component and passively influenced energy usage component may be normalized based on the overall energy usage value to arrive at a potential percent improvement value or some other dimensionless value as previously described. Moreover, rather than normalizing each energy usage component based on overall energy usage, the individual improvement values may each be normalized by dividing by the sum total of the improvements. Based on a comparison of the efficiency impact values 112, whether a normalized value or expressed in an efficiency-related unit of measurement (e.g., energy, fuel economy, range, emissions, etc.), the controller may generate a list of items most affecting vehicle efficiency, as provided at block 370. The list of items may include vehicle operating parameters or environmental conditions currently having the greatest impact on vehicle efficiency based on the efficiency impact values 112. The items may be ranked based on their respective efficiency impact values 112. At block 375, the user interface 96 may display the ranked list of items via the information display 100 as operating parameter modification messages 110 and/or vehicle condition messages 114, as set forth above with respect to FIGS. 2a and 2b. The efficiency impact value 112 associated with each displayed message may also be displayed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An information display system for a vehicle including an engine and an electric machine, each operable to provide torque to propel the vehicle, the vehicle further including an electric power source configured to provide electric power to the electric machine, the information display system comprising:
   a controller configured to:
      receive input indicative of energy usage associated with a number of vehicle operating parameters,
      for each vehicle operating parameter, calculate a fuel economy impact value associated with an operating parameter modification based on the input,
      rank the operating parameter modifications based on their associated fuel economy impact values, and
      output a plurality of operating parameter modification messages, corresponding to the operating parameter modifications, and their associated fuel economy impact values; and
   an interface in communication with the controller and configured to display the operating parameter modification messages and the associated fuel economy impact values according to their rank.

2. The system of claim 1, wherein energy usage associated with a number of vehicle operating parameters includes actively influenced energy usage associated with driver operating behavior.

3. The system of claim 1, wherein energy usage associated with a number of vehicle operating parameters includes passively influenced energy usage associated with environmental conditions.

4. A control system comprising:
   a controller configured to receive input indicative of energy usage associated with a number of vehicle operating parameters and output a plurality of operating parameter modification messages and an efficiency impact value associated with each operating parameter modification message; and
   an interface in communication with the controller and configured to display the operating parameter modification messages and their associated efficiency impact values.

5. The control system of claim 4, wherein the plurality of operating parameter modification messages are ranked based on the associated efficiency impact values and the interface is further configured to display the plurality of operating parameter modification messages and the efficiency impact value associated with each operating parameter modification message according to their ranking.

6. The control system of claim 4, wherein the efficiency impact value is indicative of an estimated potential improvement in an efficiency-related measurable upon compliance with the corresponding operating parameter modification message.

7. The control system of claim 6, wherein the efficiency impact value is a fuel consumption value indicative of an estimated potential impact on fuel economy.

8. The control system of claim 6, wherein the efficiency impact value is a distance value indicative of an estimated potential impact on vehicle range.

9. The control system of claim 4, wherein the efficiency impact value is indicative of an estimated potential percent improvement in efficiency based on an efficiency total.

10. A method comprising:
    receiving input indicative of energy usage associated with a number of vehicle operating parameters;
    for each vehicle operating parameter, calculating an efficiency impact value associated with an operating parameter modification based on the input; and
    displaying a plurality of operating parameter modification messages, corresponding to the operating parameter modifications, and their associated efficiency impact values based on a ranking of the efficiency impact values.

11. The method of claim 10, wherein the input is further indicative of energy usage associated with a plurality of efficiency impact factors.

12. The method of claim 11, further comprising:
    calculating an efficiency impact value for each efficiency impact factor based on vehicle conditions and energy usage.

13. The method of claim 12, wherein the vehicle conditions include operating conditions and environmental conditions.

14. The method of claim 12, further comprising:
    ranking the efficiency impact factors based on their associated efficiency impact values, and
    displaying a plurality of the efficiency impact factors and their associated impact values based on the ranking.

15. The method of claim 14, wherein displaying a plurality of efficiency impact factors and their associated efficiency impact values occurs during vehicle shut down.

16. The method of claim 10, wherein the efficiency impact value is a fuel consumption value indicative of an estimated potential impact on fuel economy.

17. The method of claim 10, wherein the efficiency impact value is a distance value indicative of an estimated potential impact on vehicle range.

18. The method of claim 10, wherein the efficiency impact value is indicative of an estimated potential impact on vehicle emissions.

19. The method of claim 10, wherein calculating the efficiency impact value associated with an operating parameter modification includes normalizing a potential efficiency improvement value based on a total efficiency value.

* * * * *